United States Patent

[11] 3,581,011

[72] Inventors Ronald C. Ward
 Salt Lake City;
 David T. Allen, Provo, Utah
[21] Appl. No. 848,142
[22] Filed July 28, 1969
[45] Patented May 25, 1971
[73] Assignee Telemation, Inc.
 Salt Lake City, Utah
 Continuation of application Ser. No.
 677,286, Oct. 23, 1967, now abandoned.

[54] TELEVISION BROADCAST SYNCHRONIZING APPARATUS AND METHOD
25 Claims, 13 Drawing Figs.

[52] U.S. Cl. .................................................. 178/69.5TV
[51] Int. Cl. .................................................. H04n 5/04
[50] Field of Search ....................................... 178/69.5
 (TV), 69.5 (G), 7.3, 7.5, 5.4 (SY); 328/63, 72, 42,
 187, 60, 61; 307/208, 269, 268, 247; 325/325

[56] References Cited
UNITED STATES PATENTS

| | | | |
|---|---|---|---|
| 2,748,188 | 5/1956 | Stahl et al. | 178/69.5(G) |
| 2,850,568 | 9/1958 | Welsh | 178/69.5(G) |
| 2,926,242 | 2/1960 | Feyzeau | 328/187 |
| 3,170,036 | 2/1965 | Baracket | 178/5.4 |
| 3,288,920 | 11/1966 | Baracket | 178/5.4(SY) |
| 3,359,367 | 12/1967 | Hiatt, Jr. | 178/69.5(G) |
| 3,443,024 | 5/1969 | Allen et al. | 178/5.4(SY) |

Primary Examiner—Richard Murray
Assistant Examiner—Alfred H. Eddleman
Attorney—Lynn G. Foster

ABSTRACT: A high-quality television synchronizing system, including method and apparatus, which uses a high clock or oscillator frequency and causes, solely through division of frequency, each leading and trailing edge of all sync. generator output pulses to be accurately clock-derived. In this way, inter alia, very meaningful improvements in black and white, and color time base stability, including far better color subcarrier phase stability, are attained and need for time adjustment capability is removed. Superior sync. lock characteristics are also provided.

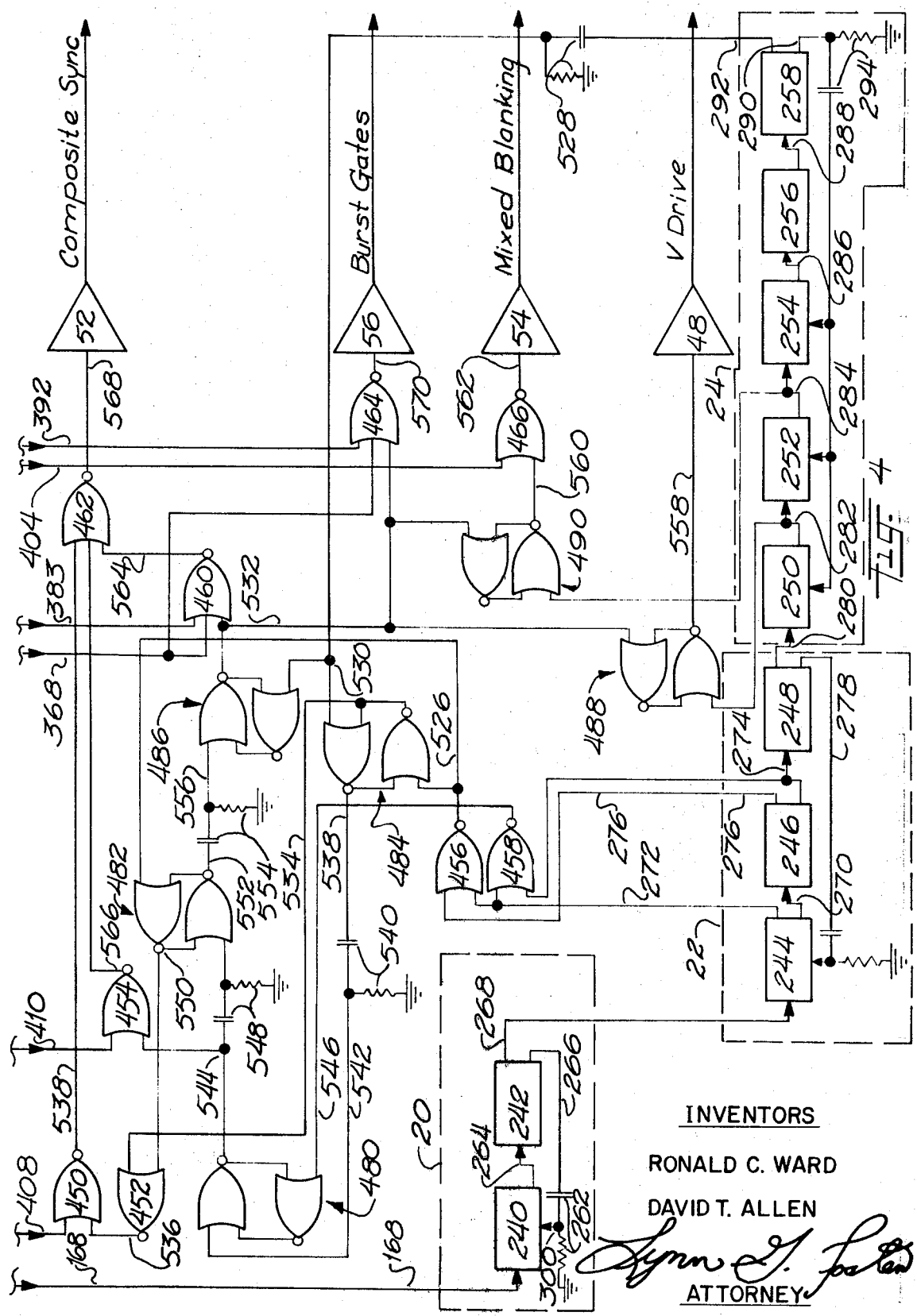

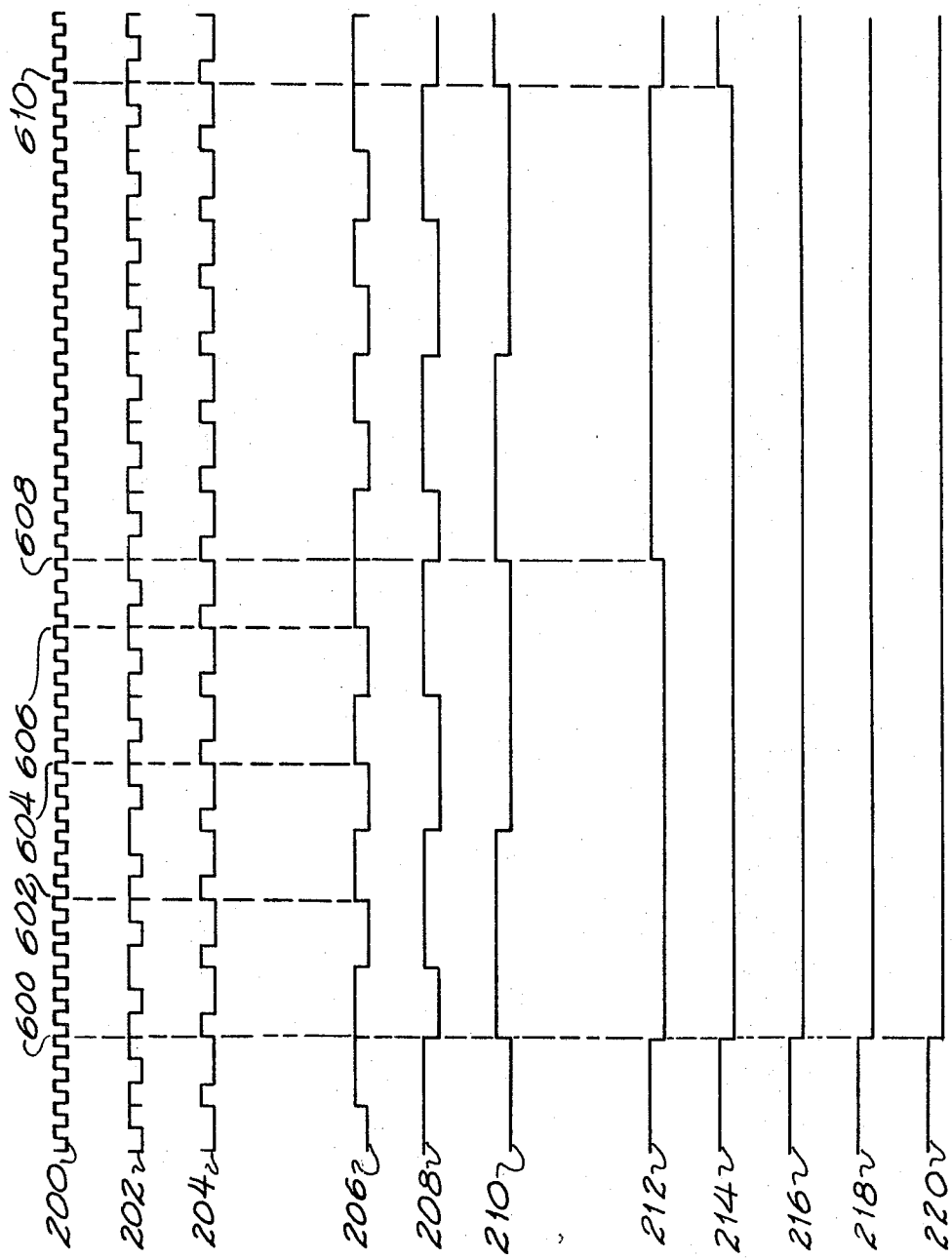

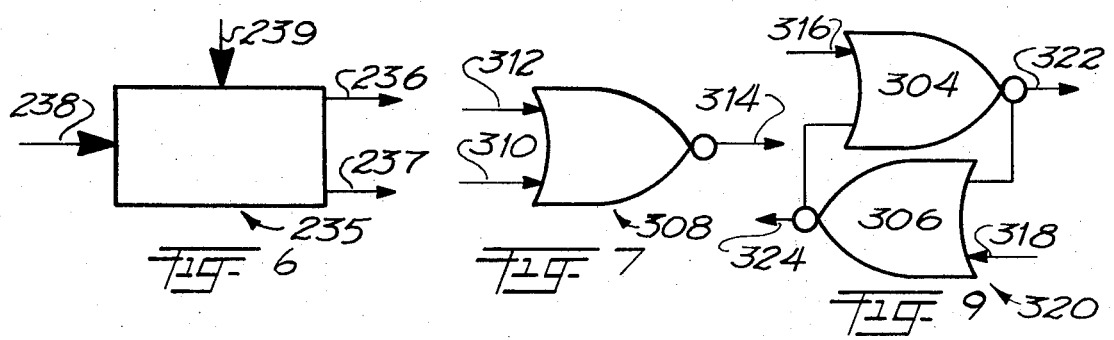
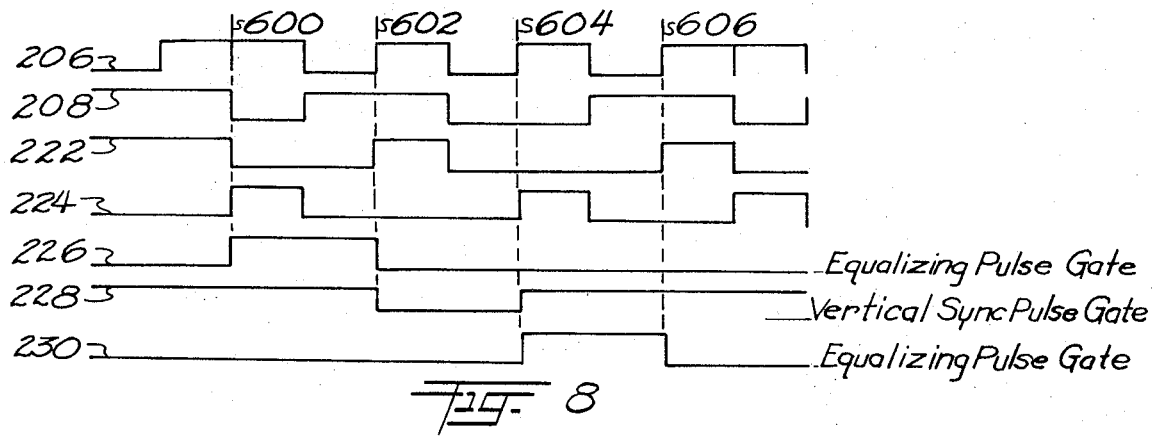
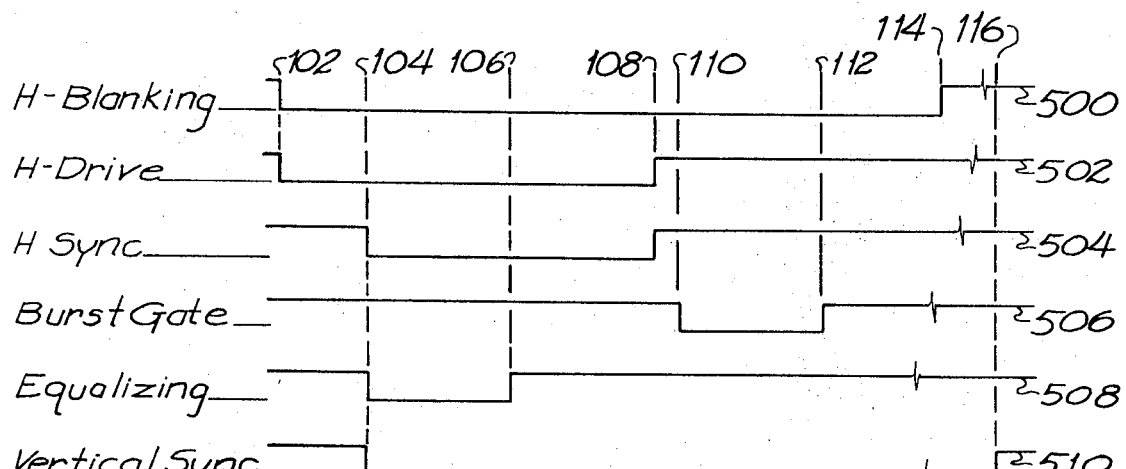

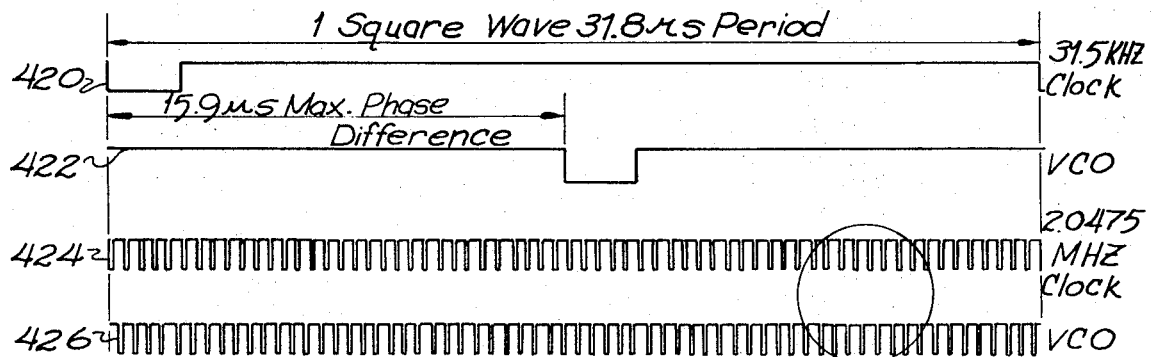
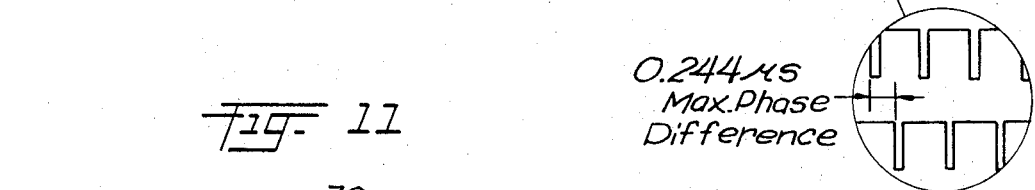
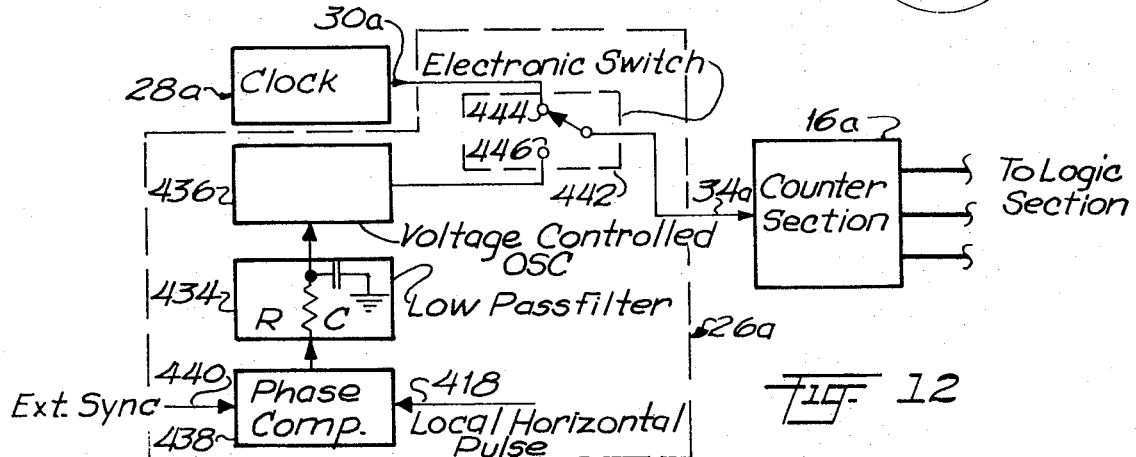
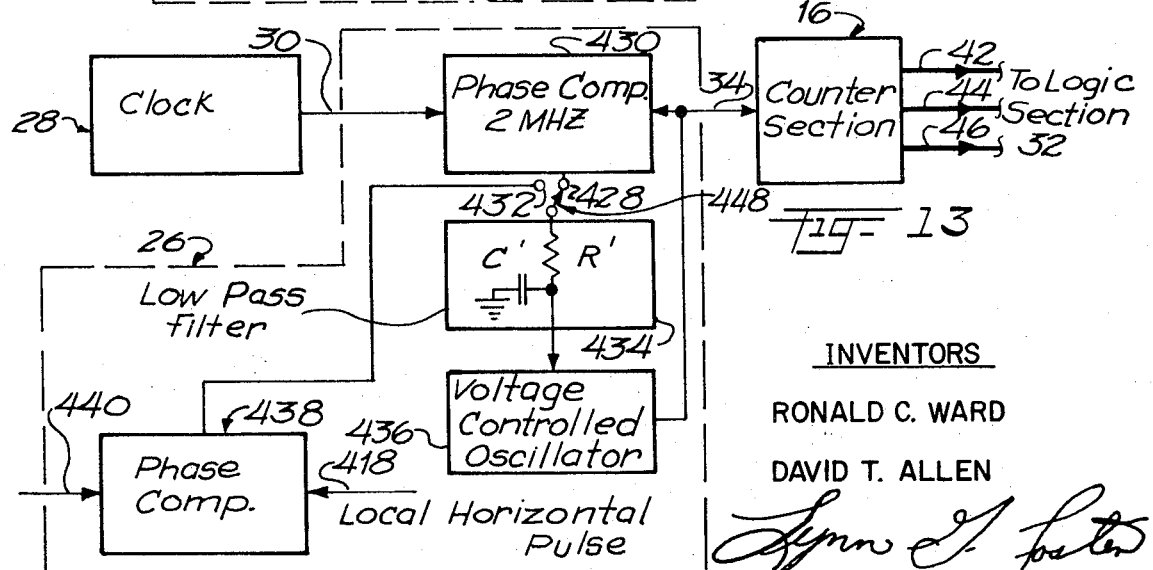

TELEVISION BROADCAST SYNCHRONIZING APPARATUS AND METHOD

This is a continuation of our copending patent application Ser. No. 677,286, filed Oct. 23, 1967, now abandoned.

This invention relates generally to television synchronization and more particularly to a superior system for generating complex electrical waveforms using a unique method and apparatus capable of simultaneously producing a plurality of synchronizing signals, for example driving blanking, keying, composite sync., and subcarrier signals required in monochrome and color television picture transmission. The system of this invention principally provides significantly improved time base stability, eliminates the need for sync. generator adjustments, and also provides improved sync. lock characteristics.

The phrase "time base stability" is used frequently in this specification to mean the maximum instantaneous deviation, in phase or frequency, of any part of a repetitive signal from the average or desired occurrence. Any such time base error is normally expressed in terms of peak-to-peak error measured in nanoseconds.

In the present art of television origination, transmission, and reproduction, it is necessary to (a) accomplish a very precise and progressive uniform scanning of images, on a light-sensitive surface using an electron beam, at the origination point using origination equipment; (b) transmit corresponding picture and timing information as an amplified modulated signal; and (c) reproduce the original images at a remote location, using reproduction equipment, by scanning a light-emitting surface using an electron beam in synchronism with the origination device. The scanning process of both origination and reproduction apparatus, is normally accomplished by means of deflecting the precisely focused electron beam within the envelope of a vacuum tube. The light-active area of such a tube is arranged essentially perpendicular to the beam axis and is thus scanned by progressive linear advance of the beam in both vertical and horizontal directions so that the point at which the beam strikes the light-active area is correspondingly advanced. This is accomplished through use of a sawtooth-shape (time vs. amplitude) deflecting waveform, with the trace (active) portion of each scanning cycle being of much longer time duration than the retrace (inactive) portion. A raster is formed in this manner, as the beam is deflected horizontally at a high rate of speed while at the same time being deflected vertically at a comparatively low velocity. It is necessary that the beam be inactive (blanked) during portions of each scanning cycle to permit retrace to a point near the initial starting point without sensing or display of image information.

According to present EIA (Electronic Industries Association) standards in the United States of AMERICA, it is normal to scan the television raster to produce 30 complete image frames per second; each frame being comprised of 525 horizontal scanning lines in two vertical fields, with the first field scanning the odd numbered 262 ½ horizontal lines and the second field scanning the alternate or even numbered 262 ½ lines. It is also adopted standard in the television industry to transmit timing (composite sync.) pulses and mixed blanking pulses, as modulation of the radio frequency carrier, coincident in time with the retrace of horizontal and vertical scanning.

Likewise, in color image transmission, according to standards adopted in the United States of America by the NTSC (National Television Systems Committee), it is necessary to transmit a short burst (approximately 8 cycles) of 3.58 MHZ. (MEGAHETZ) REFERENCE FREQUENCY FOLLOWING HORIZONTAL SYNC. AS subcarrier during active image scanning. In addition to those signals transmitted through the air for controlling the television reproduction device, horizontal and vertical drive, and color burst gate pulses are normally employed in connection with television image-origination equipment at the transmitter location.

It is common practice and well known in the art to obtain all timing and control pulses from separate outputs of a single generating device referred to as a synchronizing generator. Most such generators incorporate a "clock" oscillator, the frequency of which is chosen to produce the highest required output frequency of the generator. In the case of monochrome transmission, the highest output frequency, according to EIA standards, is twice that of the horizontal scanning rate, namely 2 times 15.75 kHz. (KILOHERTZ) or 31.5 kHz. This clock frequency is conventionally (a) divided by a factor of 2 to obtain timing for the 15.75 kHz. horizontal sweep and (b) also divided, separately using well-known methods by a 525 factor for the 60 Hz. vertical field rate.

In color image transmission, as mentioned, it has been common practice to use a clock frequency of approximately 3.58 MHz. to directly provide color subcarrier output. This same 3.58 MHz. signal is conventionally separately divided by 455 and thereafter the resultant 7.87 kHz. is multiplied by 4 to arrive at 31.468 kHz. This latter 31.468 kHz. signal is then divided further, as in the case of monochrome transmission, (just described) to provide the required horizontal and vertical scanning rate frequencies of approximately 15.75 kHz. and approximately 60 Hz., respectively. The mentioned multiplication process has proved undesirable because three of each four successive 31.468 kHz. pulses are derived from inherently unstable resonant ringing circuits. Consequently, only each fourth pulse will be clock-derived and thus be timely initiated and the precision of time presentment of the other three pulses will vary according to the stability limitations of the resonant ringing circuits.

In the early development of television, limitations such as time base instability, presented by use of synchronizing generators of the foregoing type were not regarded as a serious handicap. With the advance of the television art, especially with the advent of color television transmission and video tape recorders (VTRs), poor quality attributable to time base errors of the type caused by conventional synchronizing generators has created increasing concern, particularly because use of low frequency clock oscillators cause output waveforms to be subjected to time base errors. Matters of time base errors and reductions therein, by use of this invention, shall become more fully apparent as the description proceeds. Suffice it to say that in today's television art, especially as related to color transmission and use of VTRs for color, extremely precise timing relationship between all synchronizing generator output signals is necessary for high-quality color reproduction.

Returning to the subject of color transmission for purposes of providing background information, it is necessary in compliance with NTSC-adopted standards to broadcast, as part of the image-derived modulation, the mentioned 3.58 mHz. color subcarrier after it is phase and amplitude modulated, according to the instantaneous hue and saturation quantities of the scanned color image. The 3.58 MHz. frequency signal was originally carefully chosen as being equal to a 227-½ multiple of the mentioned horizontal scanning frequency, thus providing significant black and white dot-pattern cancellation between successive frames of image scanning. Establishment and maintenance of a precise phase relationship between the color subcarrier, the horizontal scanning lines and the vertical field rate of the reproduced raster will, therefore, desirably result in considerable visual cancellation of the dot pattern, the resultant picture being essentially a blend of the black and white when reproduced on a compatible monochrome receiver. This phenomenon is known as dot interlace. Dot interlacing displaces the black dots of a given field of frame of the raster within the white areas of the pattern of the preceding field or frame so as to minimize the otherwise undesirable effect of interference with image reproduction.

Dot interlacing is of particular importance in the reproduction of monochrome images from signals which include color information. Monochrome receiving devices are known to be more capable of reproducing the high frequency cyclic transition between black and white dot presentations of the 3.58 MHz. subcarrier information due to a lack of band-pass filtering, which is usually incorporated into color receivers. Even a slight instantaneous variation in signal frequency will inherently produce a time base error causing a deleterious disruption in the mentioned dot interlace pattern and changing the instantaneous repetition rate of the horizontal sync. pulse. This further emphasizes the need for absolutely precise timing relationships.

Along with synchronizing generators, video tape recorders comprise the two principle sources of television time base errors. The present practice of recording television image signals on magnetic tape for delayed reproduction, includes a high-speed rotation of magnetic recording heads in intimate contact with the oxide coating of the tape while advancing the tape lineally at a relatively low rate of speed. Usually a radiofrequency signal, which has been frequency modulated by a composite video signal (composite sync., mixed blanking, and image information), is applied to the recording heads to be stored magnetically within the tape oxide. It should be apparent that in order to recover undistorted video information in the reproduction of recorded information, a high degree of mechanical and electromechanical control must be maintained within the equipment.

Mechanical vibration, inertia, tape stretch, nonuniform head-to-tape contact, temperature changes and other factors limit the degree of time base stability which can be maintained by the recording apparatus. It is common practice to make duplicate tape recordings by reproducing a prerecorded composite video signal from one device, while recording it again using similar, but separate equipment. Also, recordings are often made on one recorder with a second recorder furnishing the playback function. It is obvious that use of multiple equipment and second generation recording increases the time base instability of the recovered synchronizing signals due to the inherent cumulative mechanical instability.

Video tape recording apparatus used in conjunction with color image reproduction normally requires electronic time base compensation devices to overcome the mechanical inadequacies of such equipment. Additionally, electronic time base instability from any source, also being of a cumulative nature, may cause serious problems in the television system because of the limited corrective capability of available electronic compensation equipment. Limitations imposed by long-line video transmission systems, which are subject to 60 cycle hum modulation, low frequency tilt and the like, and time base instability of the synchronizing generator may add appreciably to the total accumulated error within a system, which error may exceed the mentioned range of correction. Electronic time base correction equipment may be of the type manufactured by Ampex Corporation, Redwood City, CALIF., or Radio Corporation of America Camden, N. J., and is limited to a total time base correction of 1 microsecond. It therefore becomes apparent that the time base stability of the synchronizing generator is an extremely important factor in the production of color television signals.

In summary, prior proposals for the design of synchronizing generators have possessed certain highly restrictive and disadvantageous characteristics, especially when compared to the present invention. Most serious of these deficiencies have been (a) inadequate time base stability; (b) requirement for frequent adjustment and maintenance; (c) large physical size; and (d) unreliable operation.

In contrast to the relatively time base instable, "low" frequency clock circuit of previous sync. generator designs, usually operated at 31.5 kHz. in monochrome transmission and 3.58 MHz. for color transmission, in the presently preferred embodiment of this invention, the chosen clock frequency is several times greater than the highest frequency transition required as an output from the generator. For example only, a 2.0475 MHz. frequency may be used as the clock frequency for monochrome operation and 14.31818 MHz. for color. This "high" frequency approach, while not limited to the aforementioned frequencies, directly reduces time base instability because of improved phase jitter and fast transitional waveform characteristics. Both of these factors significantly contribute to improved output time base stability, following processing through succeeding buffer or counter circuitry. More frequent waveform transitions also accommodate common derivation of the color subcarrier and 31,468 kHz. pulse signal, during color transmission, without undesirable frequency multiplication. Further, the use of such clock-derived pulse transition permits predetermined accurate pulse width timing of all output signals.

Unlike the prior art, the present invention does not use delay multivibrators and passive delay lines for control and adjustment of various gating and output pulse widths. Such devices are inherently unstable when subjected to supply voltage fluctuation, temperature changes, component aging, and the like and permit the width of pulse signals to change instantaneously, as well as gradually over long periods of time, producing instability and requiring cumbersome and expensive means of adjustment.

While utilization of a high-clock frequency to reduce oscillator jitter, improve trigger stability, or to digitally derive output and gating pulse width is clearly novel, so far as we are aware, with this invention, the prior art, on two occasions, has disclosed utilization of somewhat higher clock frequencies than the double horizontal rate of 31.5 kHz. First, model FTL-63B synchronizing generator manufactured by Federal Telecommunications Laboratories, 500 Washington AVE., Nutley, N.J., and described in an instruction manual published in Dec. 1952, discloses a 315 kHz. clock oscillator, the undivided output of which is used solely to generate a grating dot test signal output, and is not otherwise used in conjunction with origination or transmission of image signals. Second, U.S. Pat. No. 2,515,613 issued July 18, 1950, briefly describes the use of a 94.5 kHz. crystal oscillator connected in cooperation with a tuned 31.5 kHz. oscillator for the obvious purpose of stabilizing the frequency of the latter. This three times horizontal frequency apparently was chosen, at the time of the invention of the mentioned patent, with the expectation that inexpensive, cut crystals of that era would be used.

In view of the foregoing, it is a primary object of this invention to overcome or at least alleviate some if not all of the mentioned deficiencies of the prior art by providing a novel television broadcast synchronizing apparatus and method.

It is another primary object of this invention to provide a system, including a method and apparatus, for generating television timing pulses, each leading and trailing edges of all timing pulses being clock-derived, and providing improved time base stability.

It is also an important object of the present invention to provide a novel television synchronizing generator having among other things a digital logic circuitry wherein all transitions for gating, within the generator, and the leading and trailing edges of all output waveform signals are precisely clock derived.

Another, no less significant, object of this invention is to provide a novel television-synchronizing apparatus and method for counting, by division, downward from a high-clock frequency to produce the required driving, blanking, keying, and composite sync. pulses, through digital circuitry which maintains extremely fast signal rise and decay times.

Another very significant object of the present invention is to provide novel process of and structure for locking and unlocking a television synchronizing generator in phase with an externally generated source of synchronizing signal while causing negligible disruption in the synchronism of the reproduced images.

Another object of the present invention is to eliminate the need for pulse-width adjustment capability with regard to predetermined gating and output pulses of a synchronizing generator.

It is another object of this invention to provide a synchronizing generator of reduced physical size and weight which can be easily transported from place to place.

Another object is to provide a color subcarrier generator output (having a fixed and stable phase relationship with the twice-horizontal frequency) which is derived through frequency division only and, therefore, not subjected to unstable multiplication circuitry.

These and other objects and features will become more apparent from the description to follow when taken in conjunction with the accompanying drawings wherein:

FIG. 4 is a block diagram of a presently preferred vertical divider and logic section of the synchronizing generator of FIG. 1;

FIG. 5 is a set of diagrammatic waveform graphs showing the phase relationship of various pulse-train transitions occurring within the vertical divider section (of FIG. 4) of the generator of FIG. 1;

FIG. 6 is an enlarged block diagram of the "JK" flip-flop used extensively in FIGS. 2 and 4;

FIG. 7 is an enlarged explanatory block diagram of the "NOR" gate circuit used extensively in FIGS. 2 and 4;

FIG. 8 is a set of diagrammatic waveform graphs showing the phase relationship of pulse-train transitions which are used for gating during the vertical interval;

FIG. 9 is an enlarged block diagram for explanatory purposes showing two "NOR" gate circuits connected in a set-reset configuration, widely used in FIGS. 2 and 4;

FIG. 10 is a set of diagrammatic waveform graphs showing the phase relationship of pulse transitions emanating from the individual outputs of the generator of FIG. 1;

FIG. 11 is a set of diagrammatic waveform graphs showing a comparison in maximum phase and time differential between pulses from the high frequency clock of the present invention and pulses of the relatively low frequency clock of the prior art, when each is referenced for unlocking in horizontal phase from an external signal source;

FIG. 12 is a block diagram showing a well-known horizontal sync. lock circuit, commonly used in conjunction with the conventional low frequencies of the prior art, which may be modified for use with the high frequency clock of the present invention, and FIG. 13 is a block diagram showing a horizontal sync. lock system, presently preferred for use in conjunction with the high frequency clock of the present invention.

Figure 1:
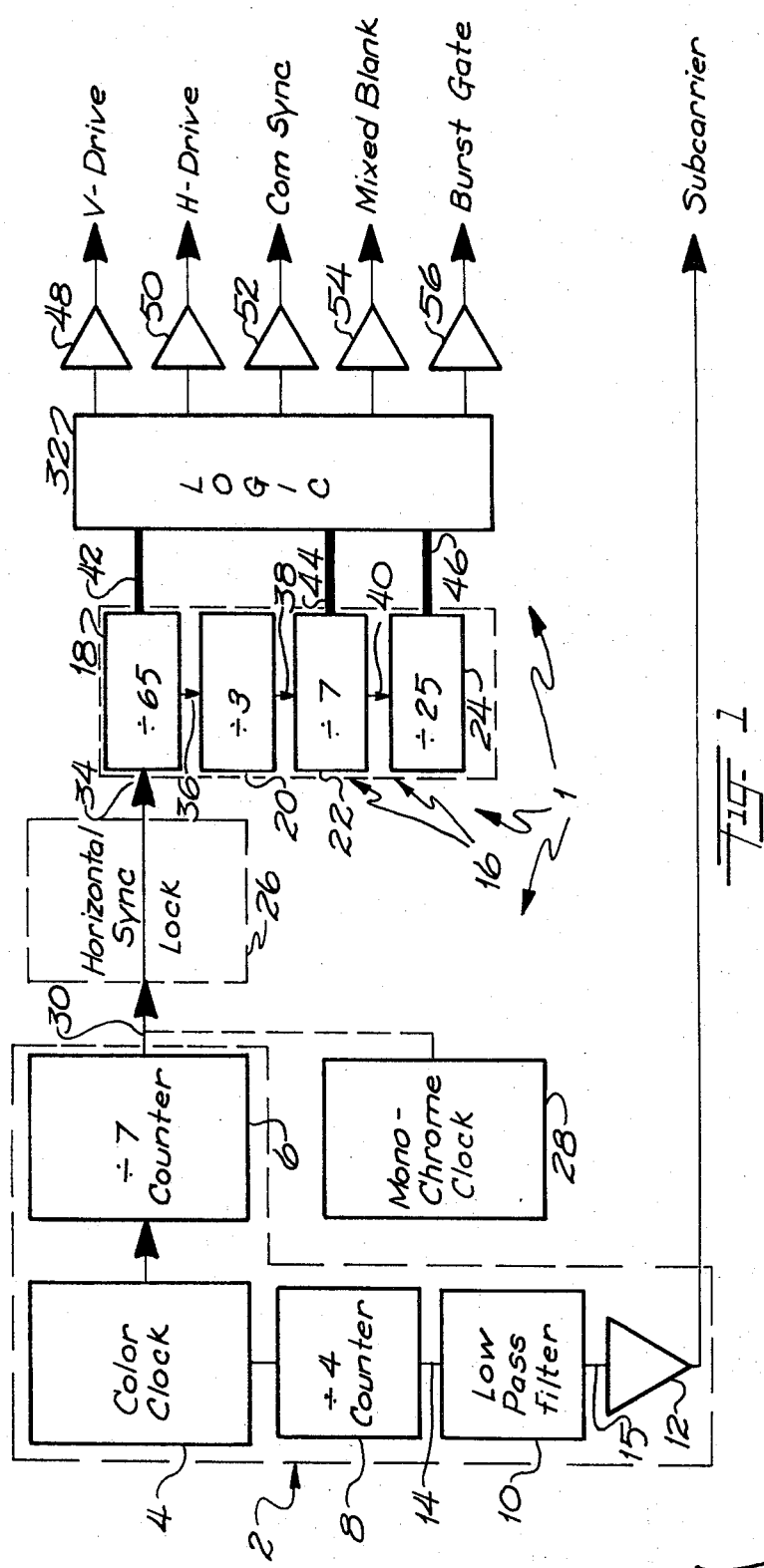
FIG. 1 is a simplified block diagram of the presently preferred synchronizing generator showing signal interconnection between the various sections of the system with the Sync. lock voltage-controlled oscillator portion shown in phantom.

Reference is now made in detail to the drawings and particularly to FIG. 1, which is a simplified block diagram depicting the presently preferred synchronizing generator of this invention, generally designated 1. That major portion of the synchronizing generator system which is required for color television transmission is generally designated 2 and comprises a high frequency clock oscillator 4 (PREFERABLY crystal-controlled and desirably accommodating a closely controlled frequency stability such that the horizontal drive output frequency of generator 1 will be 15.734 kHz. at all times); a divide-by-seven counter 6; an independently-connected divide-by-four counter 8; low pass filter 10, and output amplifier 12. SEparate voltage transitions at the clock frequency are used to time both the leading edge and the trailing edge of each output waveform from the generator 1.

In compliance with NTSC standards used in the United States, the clocking frequency is preferably chosen as being 14.31818 MHz., a "four times" multiple of the desired 3.58 MHz. color subcarrier frequency. This frequency, produced as a pulse signal at the output connection 14 of divide-by-four counter 8, and made sinusoidal by attenuation of harmonic content in low-pass filter 10, is in turn connected as a driving source at connection 15, to a suitable output amplifier 12 for distribution of color subcarrier to external equipment.

It is to be recognized that other high-clock frequencies may be chosen to accommodate any of the various transmission standards of other countries. Also, use of different multiples of the subcarrier frequency is entirely feasible.

The divide-by-seven counter 6, accepts the high 14,31818 MHz. clock frequency pulses as its driving input signal and divides downward to produce a 2.0454 MHz. continuous pulse-train connected by 30, serially through a set of counters, generally designated 16, comprising divide-by-65 counter 18, divide-by-three counter 20, divide-by-seven counter 22, and divide-by-25 counter 24.

The "sync. lock" voltage-controlled oscillator (VCO) 26 of the block diagram (shown in phantom) is optional insofar as adequate operation of the synchronizing generator is concerned and will be explained later.

For monochrome television operation, the color section 2 may be replaced by or suitably switched to high frequency clocking oscillator 28, the output of which is suitably connected to counter 18, as through connector 30, to furnish a continuous driving signal preferably at a frequency of approximately 2.0475 MHz. to counter 18. This signal is divided by a factor of 65 in block 18 and again further by three, seven, and 25 respectively in counters 20, 22, and 24, in the case of color operation.

From the foregoing, it may be seen that similar or identical "high" frequency signal sources may be used as inputs to serially connected counter blocks 16. Multiple output pulses derived from within individual counters 18, 20, 22, and 24, in turn provide logic 32 with accurately clock-timed pulse signals. It is important to note that divide-by-65 counter 18, in either instance, accepts a pulse signal at 34 of approximately 2.0475 MHz. and provides the logic 32 with a continuous pulse signal of approximately 31.5 kHz. or twice the horizontal scanning rate frequency. As mentioned earlier, synchronizing generators of the prior art used for monochrome operation, with few exceptions, have directly relied upon 31.5 kHz. as a clock frequency, to produce the highest frequency pulse transitions required as an output signal of the generator.

Figure 3:
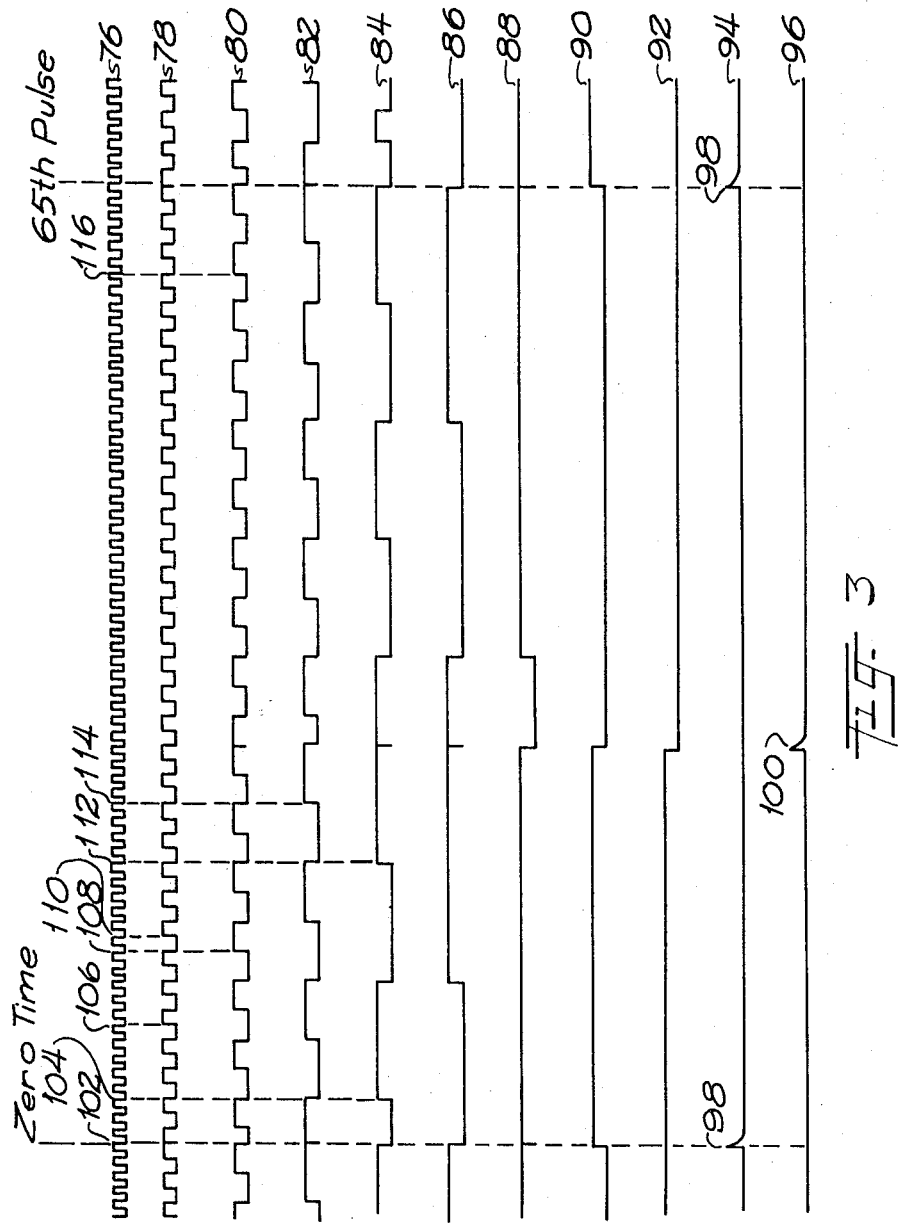
FIG. 3 is a set of diagrammatic waveform graphs showing the phase relationship of various pulse-train transitions occurring within the horizontal frequency divider section (of FIG. 2) of the generator of FIG. 1.

Referring to FIG. 1 and also to FIGS. 3 and 5, pulse-trains 76, 200, 204 and 210, inverted in polarity from those shown in FIG. 5, are presented as inputs to individual counters 18, 20, 22, and 24 (FIG. 1) respectively, the pulse-divided output of each counter successively furnishing an input pulse-train to the next counter. The division of pulses within the individual counters of set 16 is, for the most part, accomplished conventionally, insofar as progressive counting is concerned. However, it should be noted that many internally-generated signals furnished through input connections to logic 32 are used in unconventional ways which will be explained later.

To explain in greater detail, the clock pulse-train 76 (FIG. 3), having a repetition rate of approximately 2.0475 MHz., passes through connection 34, (FIG. 1), is divided by a factor of 65 furnishing a 31.5 kHz. pulse-train 200 (FIG. 5) through connection 36 to divide-by-three counter 20. Divide-by-three counter 20, in turn, through connection 38, provides a 10.5 kHz. pulse train 204 (inverted) to divide-by-seven counter 22. The pulse-divided output of counter 22 is likewise connected at 40 to furnish a 1500 Hz. pulse train 210 (inverted) as an input signal to divide-by-25 counter 24 (FIG. 1) thus producing a 60 Hz. pulse train 220 (FIG. 5).

Boldly depicted interconnections 42, 44, and 46 (FIG. 1) interposed between the set of counters 16 and logic 32, each represent a multiple of individual signal paths which are not identified here separately for the purpose of simplicity of presentation. Pulse-train waveforms 78, 80, 82, 84, 86, 88, and 90 (FIG. 3) are all passed through separate paths in multiple connection 42 (FIG. 1) to supply both normal and inverted polarity signals, with the exception of pulse train 88 which is supplied only in inverted polarity, to logic 32.

Multiple connection 44 in a like manner serves to interconnect the internally derived signals of counter 22, including normal pulsettrain 208 and inverted polarity pulse-trains 206 and 208 (FIG. 5) to logic circuit 32, while multiple connection 46 similarly provides signal paths for pulse-trains 220 (inverted), 212 (normal), and 214 (normal), shown in FIG. 5, between counter 24 (FIG. 1) and logic 32.

Logic 32 performs the function of digitally translating the signals just described into the specified vertical drive, horizontal drive, composite sync., and mixed blanking waveforms required for monochrome transmissions and additionally may furnish a burst gate pulse train necessary for color television origination. "Composite sync." as will be apparent from the following description is used in this specification to mean horizontal synchronizing signals, vertical synchronizing signals and equalizing signals mixed by commutation for the purpose of simultaneously synchronizing the horizontal and vertical scanning of remotely located reproduction devices in time with the origination apparatus, while the term "mixed blanking" is used herein to describe a complex pulse-train employed in television origination and reproduction apparatus to blank the image-scanning beam during the retrace time and is formed by way of selective commutation between horizontal and vertical blanking pulses to thus produce a single "mixed" signal. Amplifiers 48, 50, 52, 54, and 56, respectively, provide suitable isolation, amplification, and impedance matching for these output pulse-trains to accommodate distribution to external equipment.

The counters of the set 16 of FIG. 1 are individually comprised of a number of interconnected circuit modules and are commonly referred to as "JK" flip-flops. Such circuits may be of a type manufactured by Motorola INC., Phoenix, Ariz., under part number mc. 723P. For a brief explanation of the operational characteristics of the JK flip-flop circuit, with regard to the present invention, refer now to FIG. 6. The basic block 235 represents a bistable device having dual-output lead connections 236 and 237, one of which, under normal operating conditions, is maintained at a considerably higher voltage potential than its counterpart. Upon receiving a negative going transition at input 238, as an input signal, the outputs reverse state. A second input 239 provides the function of presetting the outputs to a given state so that a predetermined output is in an initial "high" potential condition.

Figure 2:
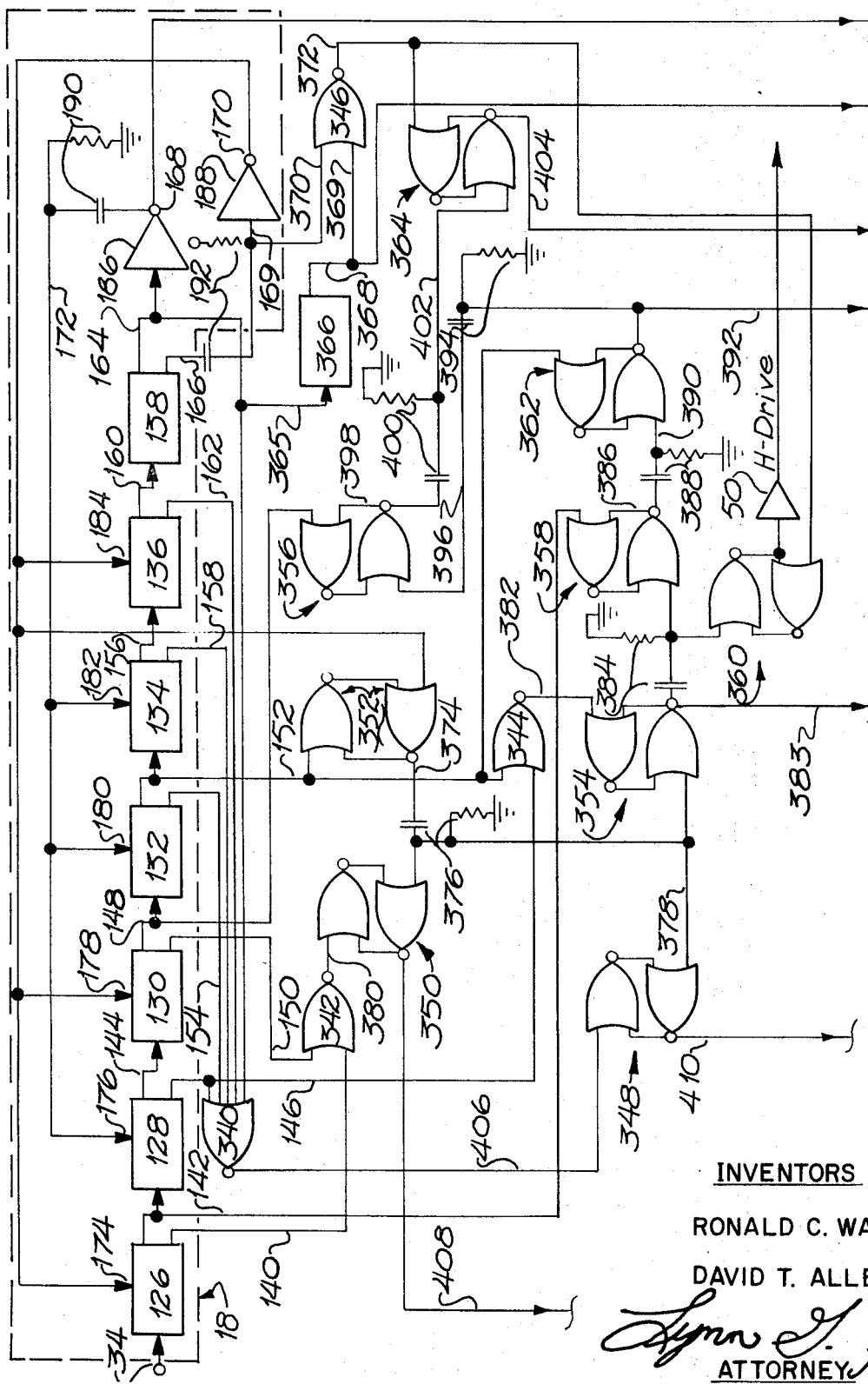
FIG. 2 is a block diagram of a presently preferred horizontal frequency divider and logic section of the synchronizing generator of FIG. 1.

For a more detailed explanation of the counters of the set 16, shown in FIG. 1, refer again now to FIGS. 3 and 5 and additionally to FIGS. 2 and 4. Divide-by-65 counter 18 comprises seven JK flip-flop circuits 126, 128, 130, 132, 134, 136, and 138 (FIG. 2) from which pulse-train waveforms 78, 80, 82, 84, 86, 88, and 90 are derived. Note that each time waveform 76 of FIG. 3, (the clock input 2.0475 MHz. signal to JK flip-flop 126) undergoes a negative transition, the outputs 140 and 142 reverse state. Output 142 of JK 126 in FIG. 2, produces waveform 78 (FIG. 3) which is connected as a toggle input to succeeding JK 128 producing output waveform 80.

Likewise, it follows that each negative transition of waveform 78 will result in a change of state at the output 144 of JK 128 to accommodate production of wave train 82 at the output of JK 130. Succeeding JK circuits 132, 134, 136, and 138, being serially connected, similarly operate upon negative toggle impulses to produce waveforms 84, 86, 88, and 90, respectively. The maximum counting capacity of this type of pulse-dividing counter is obviously determined by the limitation of each JK flip-flop to adequately divide by two in binary fashion, which in the above described circuit would result in a $2^7$ or 128 count. In order to modify the counter 18 for a reduced capacity of 65 count, 63 of the otherwise normal 128 count is eliminated by means of feedback through connections 170 and 172 to the preset inputs of JK's 126, 128, 130, 132, 134, and 136, as shown in FIG. 2.

For a more detailed explanation of the feedback connection and preset function, refer to feedback pulse-trains 94 and 96 in FIG. 3, which represent differentiated preset pulses present on conductors 170 and 172 (FIG. 2), respectively. A point in time corresponding to the first left positive-going transition or pip 98, to occur on pulse train 94, represents a reference, which for the purpose of this explanation will be considered as a zero-pulse time. Immediately following zero time, pip 98 will preset three JK flip-flops; 126, 130 and 136 at input connections 174, 178 and 184 (FIG. 2) thus simulating addition of 37 clock pulses 76 at the input of the counter 18 (FIG. 1). Thirty-two of these simulated pulses are created due to preset of JK 136 at input 184, four due to the preset of JK 130 at input 178, and one due to preset of JK 126 at input 174. The first 26 succeeding clock pulses are counted in a conventional binary fashion as they enter the counter input 34. At a time coincident with the first negative-going transition of the 27th clock pulse of pulse-train 76, a transition occurs in all counter waveforms of FIG. 3. Waveform 90 is presented to inverter 186 at input 164 producing a positive transition at inverter output 168 which is differentiated by resistance-capacitance network 190 and routed to preset inputs 182, 180, and 176 of JK's 134, 132, and 128 therein simulating addition of 26 clock transitions. Sixteen of these simulated pulses may be accounted for due to the preset of JK 134 at input 182, eight due to preset of JK 132 at input 180 and the final two due to preset of JK 128 at input 176. Succeeding clock pulses 28 through 64 are counted in a normal binary fashion. Upon receipt of the negative transition of the 65th pulse, all counter waveforms 78, 80, 82, 84, 86, 88, and 90 shown in FIG. 3, as well as the inverted output 166 of JK 138, which is not shown, undergo a transition. The inverted output 166 is connected through differentiating network 192 (FIG. 2) to input 169 of inverter 188 to produce the pip 98 (at the right) of waveform 94 (FIG. 3) at preset connection 170, to complete one counter cycle.

Divide-by-three counter 20 shown in FIG. 4, receives its input from inverter 186 (FIG. 2) at connection 168. This input is a continuous 31.5 kHz. signal as represented by pulse train 200 in FIG. 5. At each occurrence of a negative transition of waveform 200, the output 264 of JK 240 (FIG. 4) changes state as shown by waveform 202 (FIG. 5). Each time waveform 202 makes a negative transition, the outputs 266 and 268 of JK 242 also reverse state. Reversal of state of the outputs of JK 242 produces waveform 204. The transitions of waveform 204 are differentiated in resistance-capacitance network 262 after which the positive transitions preset JK 240 at input 300. This produces a feedback preset pip (not shown) which modifies the otherwise four count of divide-by-three counter 20, similarly to that of the previously described divide-by-65 counter 18.

The divide-by-seven counter 22 and divide-by-25 counter 24, shown in FIGS. 1 and 4, operate in a like manner to that of divide-by-65 counter 18 and divide-by-three-counter 20, which have already been described. Therefore, JK 244, 246, and 248 of divide-by-seven counter 22 produce waveforms 206, 208, and 210, respectively, at their individual output connections 270, 274, and 278. Waveform 208, of both normal and inverted polarity, together with waveform 206, of inverted polarity, are furnished to logic 32 (FIG. 1) through multiple connection 44. Waveform 210, inverted in polarity, is presented to input 280 of divide-by-25 counter 24 and waveform 220 is differentiated by resistance-capacitance network 294 and is used as feedback within counter 24.

Divide-by-25 counter 24 is comprised of JK 250, 252, 254, 256, and 258 serially connected to produce waveforms 212, 214, 216, 218, and 220, respectively, at output connections 282, 284, 286, 288, and 290. Waveforms 214 and 216 and an inverted polarity of waveform 220 are supplied to logic circuitry 32 through multiple conductor connections 46, shown in FIG. 1. Waveform 220 is differentiated in resistance-capacitance network 294 and used as feedback, in the counting process, within divide-by-25 counter 24.

The logic circuitry block designated 32, in FIG. 1, is comprised of a number of individual circuits commonly known as "NOR" gates. Such devices may be a type included with other circuitry in a module manufactured by Motorola INC., Phoenix, Ariz., under part No. Mc724P.

For a brief explanation of the operation of the NOR gate refer to FIG. 7. NOR gate 308, is comprised of two or more input connections, such as 310 and 312, and a single output connection 314. Under normal operating conditions, the output at 314 remains at a positive potential or "high" condition in the absence of a positive potential at one or more of input connections 310 and 312. Upon receipt of a positive potential, or pulse, at one or more of inputs 310 and 312, the output transfers to a "low" state.

Two NOR gates 304 and 306 may be connected as shown in FIG. 9, to function as a set-reset, flip-flop memory or storage device. This configuration is generally designated 320, having two input connections 316 and 318, and two output connections 322 and 324. Under normal operating conditions as in the case of the JK flip-flop described earlier, at any instant in time one of the two output connections 322 or 324 is maintained in a high condition and the other in a low state. Upon application of one or any number of successive input pulses applied to input connection 316, output connection 322 will assume a low state and output 324 a high condition. Conversely one or a number of positive pulses applied to input connection 318 will force the output at connection 324 into a low state. In other words, output at connection 322 being in a low state is indicative of input at connection 316 having received the most recent input pulse or pulses. Likewise, if the output states are reversed with the output at connection 324 being in a low state, this indicates that the input at connection 318 has most recently been driven positive.

Logic block 32, as shown in FIG. 1, is comprised of a number of digital, computerlike logic circuits connected to receive numerous pulse-train information from the various counters 18, 20, 22, and 24 and in turn provide a multitude of gating and switching functions required to determine accurate, clock-derived timing of all leading and trailing edges of vertical drive, horizontal drive, composite sync., mixed blanking, and burst gate pulses furnished to output amplifiers 48, 50, 52, 54, and 56. The term "clock derived," as will become more fully apparent as the description proceeds, is used throughout this specification to describe the transitions (leading and trailing edges) of pulse-train waveforms, wherein individual successive pulses are (A) TIMELY initiated in direct correspondence to a transition of the clock oscillator through appropriate circuitry, preferably of a digital nature; and (b) terminated in time according to a subsequent clock-generated transition through separate or additional circuitry, with the time duration between initiation and termination being controlled as a cooperative function of various portions of the mentioned circuitry.

For a detailed explanation of the operation of the logic circuitry, reference is now made to FIGS. 2, 3, 4, 5, 8 and 10. Pulse-train waveform 90 (FIG. 3), having a repetition rate of 31.5 is discharged at the output 164 of JK 138 (FIG. 2), and connected at 365 to the toggle input of JK 366. Bistable action of JK 366 divides this pulse-train by a factor of two, thus producing waveform 92 at output 368, which connects through connection 369 as an input to NOR gate 346. A 31.5 kHz. pulse-train, identical to waveform 94, except for polarity inversion, which has been differentiated at resistance-capacitance network 192, is connected as a second input 270, of NOR gate 346. The output ag 362 of NOR gate 346 therefore assumes a high-state condition coincident in time and similar in duration to each alternate differentiated 31.5 kHz. pulse at input 370.

This gating action thus produces a 15.75 kHz. short-duty cycle pulse-train (not graphically shown) at connection 372 of the inputs of set-reset flip-flops 360 and 364, thereby producing simultaneously, the leading edges of horizontal blanking waveform 500 and horizontal drive waveform 502, FIG. 10, at time 102 (FIGS. 3 and 10). The leading edge of pip 98, waveform 94, FIG. 3, sets set-reset flip-flop 352, at time 102, which is coincident with the beginning of horizontal drive and blanking, the output at 170 of inverter 188 and the set input at 152 of set-reset flip-flop 352 being interconnected therebetween by conductor 170. Later in time, at time 104 (FIG. 3) waveform 84 makes a positive transition which resets set-reset flip-flop 352 at input connection 152. The output of set-reset 352 at connection 374 is differentiated by resistance-capacitance network 376, and connected at 378 to set-reset flip-flops 348, 350, and 354, thus precisely creating the leading edges of continuous wave trains, as represented by waveform 510, 508, and 504, respectively. These waveforms are to be commutated in selective gating at the 60 Hz. vertical rate to provide composite sync., the process of which will be explained in greater detail later. An inverted polarity of waveforms 82 and 78, respectively, present at output connection 150 and 140 of JK 130 and JK 126, are presented as inputs to NOR gate 342, maintaining the output connection 380 of NOR gate 342 at a low-state condition until time 106 when waveform 78 (inverted) at input 140 undergoes a negative transition. This transition causes NOR output connection 380 to assume a high or positive state, thereby resetting set-RESET flip-flop 350, as shown in waveform 308, FIG. 10, to determine equalizing pulse width.

An inverted polarity of the waveform 80 of FIG. 3, and waveform 84, are presented through connections 146 and 152 as inputs, therefore maintaining the output of NOR gate 344, at connection 382, in a low state until time 108, when set-reset flip-flop 354 is reset at input connection 382, by a positive transition of waveform 80 to determine the time duration of horizontal sync. waveform 504, FIG. 10. The output, at connection 383 of set-reset flip-flop 354 is differentiated by resistance-capacitance network 384 and presented as inputs to set-reset flip-flops 358 and 360, in such a manner as to set set-reset flip-flop 358, while simultaneously resetting set-reset flip-flop 360, thereby ending the horizontal drive pulse, graph 502, at time 108 (FIG. 10).

At time 110, waveform 78 at connection 142, resets set-reset flip-flop 358, causing the output at connection 386 to transfer to a high state creating a positive pulse which is differentiated by resistance-capacitance network 388, and furnished as an input, through connection 390, to set-RESET flip-flop 362, to initiate the burst gate pulse of waveform 506, (FIG. 10) at output 392.

At time 112, waveform 84 makes a positive transition, resetting set-reset flip-flop 362 at input connection 152, causing the output at connection 392 to assume a high-state condition, thereby determining the time duration of burst gate pulse. See waveform 506, FIG. 10. This positive transition at time 112 is also connected to resistance-capacitance network 394 and further, presented at the input, to set set-reset flip-flop 356 at connection 396.

At time 114, waveform 82 makes a positive transition which resets set-reset flip-flop 356 by means of connection 148 to its input, causing the output to assume a high state at connection 298. This produces a positive pulse at time 114 which is differentiated by resistance-capacitance network 400 and connected as an input to reset set-reset flip-flop 364, at input connection 402. This causes the output of set-reset flip-flop 364 to assume a high state to determine the pulse width of horizontal blanking waveform 500, FIG. 10. Waveform 90, as shown in FIG. 3, and waveforms 88, 86, 84 and 80, inverted in polarity from that shown in FIG. 3, are connected as inputs to a five-input NOR gate 340 by means of connections 164, 162, 158, 154, and 146, respectively. One or more of these waveforms are of a high state to hold the NOR gate output, at connection 406, in a low-state condition until waveform 80 (inverted) makes a negative transition at time 116. The output of NOR gate 340 is connected through 406 to reset the input of set-reset flip-flop 348 at connection 406. Thus a positive-going transition at time 116 is produced to determine the time duration of individual vertical sync. pulses, represented by waveform 510 in FIG. 10.

The foregoing explanation of the horizontal logic section of the presently preferred embodiment of this invention has now described the generation of continuous repetitive pulse-trains representing timing and pulse width of horizontal sync., vertical sync., horizontal blanking, equalizing pulses, burst gate pulses and horizontal drive pulses. All of these pulse waveforms with the exception of horizontal drive, are connected as inputs to the vertical logic section, yet to be described, to be selectively processed by the various gating circuits to create the composite sync., mixed blanking and burst gate outputs of the generator. IT SHOULD BE NOTED, HOWEVER, THAT THE PULSE REPETITION rate of all of the pulses derived within the horizontal logic circuits and connected as inputs to the vertical logic circuits, with the exception of horizontal blanking, are occurring at a repetition rate of 31.5 kHz. It will be necessary, using circuits to be described later, to eliminate alternate pulses of the horizontal sync. and burst gate continuous pulse-trains in order that a repetition rate of 15.75 kHz. appear prior to their utilization as output pulses in the television system.

Referring now to FIGS. 4, 5, and 8, for a detailed explanation of the vertical pulse logic circuitry of logic 32, a waveform emanating from 258, inverted in polarity but otherwise identical to waveform 220, shown in FIG. 5, is differentiated in resistance-capacitance network 528 (FIG. 4) and routed to set set-reset flip-flops 484 and 486, through connection 530. This causes the output at connection 532 of set-reset 486, to assume a high-state condition at time 600 (FIG. 5). Connection 532 serves to interconnect the output signal developed by set-reset flip-flop 486 to NOR gates 460 and 464 and also to set-reset flip-flops 488 and 490.

The output of NOR gate 460, therefore, assumes a low state beginning at time 600 to eliminate horizontal sync. for the time duration of nine horizontal lines during vertical blanking. NOR gate 464, likewise at time 600, at its output assumes a low state for a like duration to eliminate burst gate during vertical blanking time. The beginning of vertical drive and vertical blanking are determined as (FIGS. also coincident in time with instantaneous time 600, each output having assumed a high state due to input set pulses at connection 532.

Waveforms 206 and 208 (FIG. 8) are abbreviated duplicates of those shown in FIG. 5, and are used for the purpose of establishing proper timing relationship for gate-driving waveforms 222, 224, 226, 228, and 320. Waveforms identical but of inverted polarity to those designated 206 and 208, in FIGS. 5 and 8, having been produced as outputs of JK 244 and 246, respectively, in counter section 22 FIGS. 1 and 4), are presented as inputs to NOR gate 456 through connections 272 and 276. These input pulses produce waveform 222 at the output of NOR gate 456.

Set-reset flip-flop 484, now being in a set condition as shown in waveform 224 due to a differentiated pulse at its input through connection 530 at time 600 as described earlier, is maintained with its output in a high state at connection 534 for a period of time equal to that required to scan three horizontal lines. A positive voltage produced by this high condition is presented to the input of NOR gate 452, through connection 534, thereby creating a low-state condition at the output of NOR gate 452, which further couples to the input of NOR gate 450, through connection 536. This permits equalizing pulses to pass from the input at connection 408 to the output of NOR gate 450, to connection 538.

It will be helpful to note at this point that various predetermined conditions instantaneously exist with regard to gating and the state of the individual generator outputs. More specifically, between times 600 and 602 (FIGS. 5 and 8) horizontal sync. is eliminated at NOR gate 460, in favor of equalizing pulses passing through gate 450. Vertical blanking and vertical drive are in an "on" condition, being generated by their respective set-reset flip-flops 490 and 488. Burst gate pulses are eliminated at NOR gate 464.

At time 602, waveform 222, mentioned earlier, undergoes a positive transition, and being connected as an input to connection 526 thereby resets set-reset flip-flop 484, and returns the output at connection 534 to a low state. This low-state condition in turn effects the gating off, of equalizing pulses at NOR gate 450, in favor of vertical sync. pulses which are at time 602 gated on at NOR gate 454, due to the fact that output connection 538 of set-reset flip-flop 484, in reverting to a high state to eliminate equalizing pulses, provides an impulse, which was theretofore differentiated in resistance-capacitance network 540 and presented as an input at connection 542 of set-reset 480. This creates a high state at the output of set-reset flip-flop 480 for coupling by connection 544, to NOR gate 454 input.

Waveform 208 and an inverted polarity of waveform 206 (FIGS. 5 and 8) is presented as inputs to NOR gate 458 through connection 274 and 272, respectively, to produce output waveform 224 at connection 546. At time 604 waveform 224 undergoes a positive transition to reset the input of set-reset flip-flop 480 at connection 546, thus preventing vertical sync. from passing through NOR gate 454 due to a high condition at its input. The pulse created by this transfer to a high condition is coupled by connection 544 to resistance-capacitance network 548, differentiated and further connected, as a set input, to set-reset flip-flop 482. As set-reset 482 is set, an input of NOR gate 452 is driven positive at connection 550 causing the output of NOR gate 452, to assume a low state which in turn through connection 536 causes NOR gate 450 to pass equalizing pulses from its input at connection 408 to its output connection 538.

At time 606, the second positive transition to occur in waveform 222 resets set-reset flip-flop 482 by means of connection 526 at its input, thereby reversing the output state at connection 550 to again eliminate equalizing pulses at gate 450. The resetting of set-reset flip-flop 482 causes output connection 552 to assume a high state, the transition of which passes through differentiating resistance-capacitance network 554 to the input to set set-reset flip-flop 486 by means of connection 556, thereby restoring horizontal sync. through NOR gate 460.

At time 608, waveform 212, (FIG. 5), at connection 282 resets the vertical drive set-reset flip-flop 488 to reverse the output state at connection 558 and terminate the vertical drive which was initiated, as previously described, at time 600. At time 610, waveform 214 (FIG. 5) makes a positive transition at connection 284 and resets set-reset flip-flop 490, reversing the output state at connection 560, to terminate and thus determine the time duration of vertical blanking.

Connection 560 (FIG. 4) serves to couple the resultant positive-going pulse (waveform 214, FIG. 5), which began at time 600, to an input of NOR gate 466, the output of which is gated by this vertical pulse to alternately produce horizontal blanking from input 404, and vertical blanking from input 560, to establish mixed blanking at connection 562.

A 15.75 kHz. symmetrical square wave is present at the output of JK flip-flop 366, (FIG. 2), and coupled to the inputs of NOR gates 460 and 464 (FIG. 4), through connection 368, in order to eliminate each alternate horizontal sync. and burst gate pulse which would otherwise produce an unwanted 31.5 kHz. rate. Therefore, burst gate pulses represented by waveform 506 (FIG. 10) at a recurring rate of 15.75 kHz. are presented from the output of NOR gate 464, through the input connection 570 of amplifier 56.

Horizontal sync. is also processed to provide, at the output of NOR 460, the proper 15.75 kHz. rate for application through connection 546 to NOR gate 462. In a fashion similar to the described blanking mixing process, three-input NOR gate 462 serves to alternatively pass to its output (a) horizontal sync. (input through connection 564), (b) equalizing pulses (input through connection 538), and (c) vertical sync. (input through connection 566), all having been previously gated as explained earlier, to produce composite sync. at connection 568.

With reference to FIGS. 1, 2 and 4, output amplifiers 48 (vertical drive), 50 (horizontal drive), 52 (composite sync.), 54 (mixed blanking), and 56 (burst gate), the inputs of which are furnished with individual pulses properly formed in time and time duration, serve to adequately amplify and distribute, at the proper line impedance, the required pulse amplitude for interconnection with external equipment.

In modern television origination facilities, it often becomes desirable to lock the output pulses of the synchronizing generator in frequency and in phase with a remote source of composite sync. signal. This capability becomes a necessity in the process of creating special effects wherein two or more images, being originated in separate facilities are keyed or superimposed to produce a common mixed image. Synchronism between the local synchronizing generator and a remote source may be achieved in any number of well-known methods to vary the output pulse frequencies (vertical and horizontal) of the local generator until the proper phase is established with the external reference source and then to rigidly control and thus maintain this inphase relationship so that all comparable pulse outputs between the generator and the source occur in unison. Any attempt to alter the output frequency of the local generator causes a corresponding disruption in the otherwise uniform scanning of image information. This disruption according to the method used and its associated circuitry, may be (a) reasonably insignificant and undetectable when spread over a long period of time. or (b) may be of considerable magnitude when sync. lock is rapidly achieved. Accordingly, it is apparent that in order to accomplish sync. lock and unlock with the least perceivable raster disruption, it is necessary to limit the time rate of change or the range of change or both of the frequency and phase shift correction required.

It is well recognized that sync. lock at the vertical pulse rate poses no serious problem with regard to raster disruption, when locking is properly executed according to well-known methods. Vertical rate lock is usually accomplished by momentarily altering the normal division function of counters, through which the 60 Hz. pulses are derived, until proper phase coincidence is achieved. This alteration may easily be accomplished by producing only a minute change in the 60 Hz. frequency for a long period of time (e.g. 5 seconds) until pulse phase coincidence is achieved. Vertical phase- lock is then maintained as long as the horizontal pulses remain in step, both having been initiated from a common clock source.

It is also recognized and well known that, although a significant horizontal pulse frequency differential may exist between the local and remote generators, the local generator, upon assuming a clock frequency identical to that of the remote generator and later reverting to its original state, represents only a minor disruption in the television raster when achieved over long periods of time, e.g. the time required to scan several horizontal lines.

The most serious source of raster disruption occasioned when using previous sync. lock systems, has centered around the necessity of achieving a proper inphase relationship between the locally and remotely generated horizontal signals at the instant of initiating and terminating a sync. lock period.

Prior proposals have failed to overcome serious disruptions in the continuity of the instantaneous phase of horizontal pulse train information of the local generator caused during the process of locking to and unlocking from remotely generated signals. This failure is partially due to limitations invoked by the use of y low frequency clocks which commonly operate at a twice multiple of the horizontal scanning frequency. Also, partially at fault has been the practice of employing direct switching techniques in the selection of clock-timing pulses between alternately locked and unlocked conditions. In other words, during sync. lock it is normal to switch from a clock output to the output of a voltage-controlled oscillator having essentially the same output frequency as the clock, but having the additional capability of producing a change in output frequency corresponding to a change in input voltage.

Instantaneous switching, at various points in time, therefore, may present pulse signals, alternately derived from the clock and the VCO, to succeeding counter circuits which are phase-displaced as much as one-half the period of the clock frequency.

The present invention, using a high-FREQUENCY clock in cooperation with a high frequency phase comparator, successfully overcomes the identified inadequacies of the prior art with regard to locking and especially unlocking, in phase to and from a remote source.

For a more detailed explanation concerning the ramifications of horizontal phase lock as relating to the present invention and the prior art, refer to FIGS. 11, 12, and 13. First, to describe the operation of a well-known sync. lock circuit which may be adapted to this invention, reference is made to the block diagram of FIG. 12. This is a system, generally designated 26a, wherein, under normal operating conditions, the clock pulses generated by clock 28a pass at connection 30a to electronic switch 442, which is in a state to conduct, as represented by switch position 444. These clock pulses are further passed through connection 34a to a set of counters 16a, similar to counter set 16. Phase comparator 438 of FIG. 12 receives remotely generated pulses at input 440 and locally generated pulses at input 418, to produce a control voltage which in turn is connected through low-pass filter 434, to voltage-controlled oscillator (VCO) 436.

Because switch connection 446 at the output of VCO 436 is open at this point in time, the frequency of VCO 436 bears only an inexact relationship with that of the local horizontal pulses entering phase comparator 438 at input 418. In the unlocked condition, the pulse train entering phase comparator 438, at input 440, also having no coincidence in phase or frequency with the signal at 418, produces a control voltage through low-pass filter 434, in an attempt to correct the frequency of VCO 436. Thus, VCO 436 is at this being erroneously corrected to an incorrect frequency above or below that of operating clock 28a, limited only by the variable range of VCO 436. Therefore, as sync. lock is initiated by a transfer of switch 442 from position 444 to position 446, this incorrect frequency of VCO 436 is initially applied to the input of counter section 16a at connection 34a, before the VCO 436 acquires a satisfactory correction frequency. Therefore, the time range of frequency correction is undesirably large, thereby producing a comparatively long period of raster disruption. The input pulses at input 418, having an instantaneous proportional frequency error to that of VCO 436, are now compared in phase comparator 438, with the external source present at input 440 to correct the control voltage to VCO 436, and in turn the frequency of the input signal at connection 34a of counter set 16a at a rate determined by the time constant of filter 434 until phase coincidence is achieved between the two input signals at inputs 440 and 418 of comparator 438. Thus, sync. lock is achieved. Termination of the sync. lock period may then be accomplished by switching back to position 444 of switch 442, to again communicate pulses of oscillator 28a to counter section 16a at input connection 34a.

With the foregoing explanation in mind and referring also now to FIG. 11, certain comparisons may be made with regard to the sync. lock system 26a as used in conjunction with low-FREQUENCY clock circuits of the past and as modified and used with the present invention, in conjunction with the high frequency clock. In either instance, horizontal sync. lock must be accomplished by comparison of pulse-trains from 440 and 418 having a repetition rate of 15.75 kHz. in comparator 438, requiring compensation for as much as 31.8 microseconds of maximum phase displacement upon the actuation of sync. lock circuit 26a. Both the mentioned low frequency clock signals of the prior art and high frequency clock signals used with this invention will create equal amounts of raster discontinuity in undergoing sync. lock. Waveforms 420 and 422 are representative of 31.5 kHz. pulses having a time period between successive leading edges of 31.8 microseconds and an out-of-phase relation of 15.9 microseconds, which would be the worst possible out-of-phase relationship. Assuming this out-of-phase relationship to exist, as electronic switch 442 is returned from sync. lock position 446 to clock-timing position 444, with clock 28a generating waveform 420 and VCO 436 generating waveform 422, it can be seen that a one-fourth line (15.9 $\mu$) ) disruption will occur. This disruption will appear in a form similar to that of an undesirable switching transition in the reproduced television raster.

Circuit 26a may be modified to function in cooperation with the present invention so as to comprise a high frequency clock and a y high frequency VCO to generate waveform 424 in clock circuit 28a and waveform 426 in VCO 436. Assuming that both waveforms are occurring at the previously mentioned high-clock frequency of 2.0475 MHz., no more than 0.224 microseconds of phase displacement, as is shown by the enlarged portion of the waveform, may be detected upon instantaneously returning switch 442 to the unlocked position 444. The use of a high frequency clock in conjunction with sync. lock circuit 26a in FIG. 12, can therefore reduce the resultant raster disruption to a small fraction (1/65) of that created by returning to the 31.5 kHz. clock signal.

The presently preferred sync. lock system of this invention, generally designated 26 in FIG. 13, is somewhat similar, though distinct from the design and function of that of FIG. 12. However, sync. lock system 26 is intended for use only in conjunction with the high-FREQUENCY clock signals used with the present invention and produces considerably less undesirable raster disruption upon initiating and terminating sync. lock.

An additional high-FREQUENCY phase comparator 430 is provided at the output of high frequency clock 28. No direct switching is involved in the selection of clock timing. Rather VCO 436 of FIG. 13 provides continuous pulse-train information to counterset 16 at connection 34. Switching between sync. lock and clock operation involves the switching of oscillator control voltage between the outputs of phase comparators 438 and 430 at switch positions 432 and 428, respectively, of switch 448.

To explain in greater detail the operation of this improved sync. lock circuit, clock 28 and VCO 436, both operating at high frequencies such as the previously mentioned 2.0475 MHz. frequency, are connected to respectively furnish signals at connections 30 and 34 to phase comparator 430. A correction voltage corresponding to the phase difference between the output signals of clock 28 and VCO 436 is thereby present at position 428 regardless of the selected position of switch 448. Under normal operating conditions, although clock 28 is not connected directly to counterset 16, clock 28 serves the function of providing a reference pulse-train to hold VCO 436 rigidly in phase and frequency according to the clock output. The capacitor C' of low-pass filter 434 of FIG. 13 is charged according to the correction voltage supplied from switch 448 through the resistor R' of low-pass filter 434, and the time rate of voltage change can only occur at a controlled rate as determined by the RC time constant provided by low-pass filter 434. Just as in the case of sync. lock system 26a of FIG. 12, horizontal pulse-train information is supplied to phase comparator 438 of FIG. 13 at inputs 440 and 418, respectively, by a remotely located generator and the output of the local sync. generator. These inputs are compared in phase comparator 438 to produce correction voltage at position 432 of switch 448. The VCO 436 is always in a controlled condition because it always comprises part of a closed circuit. Therefore, the RC network of filter 434 will always tend to feed the VCO 436 so as to maintain the proper frequency. Consequently, when shifting to the sync. lock position with switch 448 closed at terminal 432, any raster disruption caused by any out-of-phase relation between the inputs at 418 and 440 will be greatly reduced because the correctly charged capacitor C' will only slowly accommodate a change in voltage. Capacitor C' of low-pass filter 434 of FIG. 13 maintains nearly proper correction voltage at switch 448 during the transfer so that only a small change in voltage is required to change the frequency of VCO 436 a correspondingly small amount. This, in addition to the fact that low-pass filter 434 limits the time rate of change so as to inherently occur over a relatively extended time period, produces a marked reduction in the raster disturbance resulting from establishment of horizontal sync. lock. Again, in the process of unlocking, considerable improvement is achieved with the unit 26 over that of circuit 26a because of the small change in time required in unlocking in phase at high frequencies and the retardation of lock time by low-pass filter 434.

Minimizing disruption in the synchronizing signal and the resultant generator raster, as is possible according to the present invention in the manner just described, is of particular importance, in that initiation and termination of sync. lock control will have negligible affect on other equipment such as VTR's and remotely located reproduction devices. Also automatic reversion to clock control and then back to sync. lock due to a loss of external reference signal, which is commonly done in many sync. lock systems is less noticeable in the reproduced images.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description; and all changes which come within the meaning and range of equivalency of the claims are therefore to be embraced therein.

What we claim and desire to be secured by Letters Patent is:

1. In a television sync. generator mechanism comprising a signal source, and counting circuitry, the improvement comprising digital logic circuitry disposed in electrical communication with the counting circuitry and comprising interrelated digital components to precisely define the time of beginning and time of duration of each pulse-TRAIN, said components being control-activated by impressed pulse signal waveforms to alter the state of input and output portions of the digital components thereby digitally translating input signals received from the counting circuitry into specific television origination pulse-trains each pulse of which has the mentioned precise time of beginning and precise time duration accurately marked by changes in state of the digital components.

2. In a mechanism as defined in claim 1 wherein the interrelated digital components comprise pulse-responsive (a) gate circuits, (b) flip-flop circuits and (c) circuits which function to control the gate circuits and the flip-flop circuits upon command from the counting circuitry.

3. In a mechanism as defined in claim 1 wherein the interrelated digital components comprise: means creating vertical drive, horizontal drive, composite sync. and mixed blanking waveforms required for monochrome television signal origination and transmission.

4. In a mechanism as defined in claim 1 wherein the interrelated digital components comprise: means furnishing a burst gate output necessary for color television origination.

5. Apparatus for locking and unlocking signals from a local television synchronizing generator source to and from an external remote television synchronizing source in phase and frequency with negligible reproduced image disruption comprising a clock source of high-FREQUENCY signals, said high frequency being several times greater than the highest f frequency required as a generator output, the high frequency signals comprising a continuous uninterrupted input to a first phase comparator also in electrical communication with an input to counter means; a second phase comparator comparing the respective pulses derived from the mentioned two synchronizing sources and producing an output signal that controls the frequency of a high frequency controlled-oscillator to establish and maintain a fixed phase relationship between the two synchronizing sources; a switch alternately (a) locking the apparatus in phase and frequency sync. lock when the switch electrically joins the second phase comparator to the input of the controlled-oscillator and (b) unlocking the apparatus when the switch electrically joins the first phase comparator to the input of the controlled-oscillator; the switch continuously passing signals, when locked and when unlocked, to a low-pass filter and the high-frequency-controlled oscillator serially interposed between the switch and the counter means whereby disruption in reproduced images is minimized at initiations of sync. lock as the frequency and phase changes are spread over a comparatively long period of time because the low-pass filter restricts the time rate of voltage change which can occur.

6. In a television-synchronizing apparatus: means selectively issuing to external equipment at least an entirely clock-derived composite sync. output, a source of continuous clock pulses from which the beginning and ending transitions and time duration between transitions of the composite sync. output are derived at predetermined times, a set of counters arranged in electrically connected relation receiving the clock pulses and formulating without time delay circuitry a plurality of pulse-trains, logic circuitry to which said pulse-trains are communicated following frequency division and from which signals are sent to the selectively issuing means, and structure for deriving a color subcarrier comprising counter means frequency dividing clock pulses.

7. In a television-synchronizing apparatus: means selectively issuing to external equipment at least an entirely clock-derived composite sync. output, a source of continuous clock pulses from which the beginning and ending transistions and time duration between transitions of the composite sync. output are derived at predetermined times, a set of counters arranged in electrically connected relation receiving the clock pulses and formulating without time delay circuitry a plurality of pulse-trains, logic circuitry to which said pulse-trains are communicated following frequency division and from which signals are sent to the selectively issuing means, and means forming part of the set of counters and means forming part of the logic circuitry which act together to derive a color burst gate wave train.

8. Apparatus for locking and unlocking a local television sync. generator in phase and frequency to and from a remote source of synchronizing signals while causing negligible disruption in reproduced images; a controlled oscillator generating a frequency several times greater than the normal horizontal scanning rate said frequency being controlled by the output of a phase comparator responsive to the mentioned synchronizing signals; a clock oscillator emitting signals at a correspondingly high frequency; switching means for alternately coupling the output of the phase comparator to the controlled oscillator and the clock oscillator to a counter means to lock and unlock the sync. generator.

9. Apparatus for originating a plurality of selected broadcast television-synchronizing signals including composite sync. comprising: a source of high-FREQUENCY clock signal to produce a continuous pulse-train having a frequency several times greater than the highest frequency required as an output from the apparatus, a plurality of couting circuits receiving the continuous high frequency clock pulse-train and counting down the clock-originaed transitions of the signal input solely through frequency division without frequency multiplication to create a number of distinct entirely clock-derived counting circuit output pulse-trains, logic circuitry including gate circuitry upon which the counting circuit output pulse-trains are impressed as inputs, which logic circuitry passes only selected clock-derived pulse transitions precisely at desired times to accurately creae the leading and trailing edge of each pulse waveform of output signals issued from the apparatus.

10. In a method of providing improved television synchronization, generating an original continuous signal, frequency dividing the original signal by count reduction into a family of distinct pulse-trains without frequency multiplication, and individually gating without intentional pulse time delay the family of pulse-trains to develop therefrom in exact time relation the occurrence of each output waveform transition and the time duration between transitions.

11. In a synchronizing generator for color television: a clock oscillator adapted to continuously generate high-FREQUENCY signals; means for deriving a color subcarrier output having a stable phase relationship and comprising clock-frequency dividing means continuously operative upon the clock signal to derive the color subcarrier frequency compatible with accepted television standards; additional clock-frequency dividing means continuously operative upon the clock signal to derive the color subcarrier frequency compatible with accepted television standards; additional clock-frequency dividing means and gating circuits of deriving the timing of generator output signals other than color subcarrier required for both monochrome and color television origination including vertical drive pulses, horizontal drive pulses, mixed blanking pulses and composite sync. pulses as well as color burst gate pulses.

12. In a synchronizing generator as defined in claim 11 wherein said additional clock-frequency dividing means comprises a plurality of frequency-dividing counters operative to first divide the clock signal and then subdivide the divided clock signal to derive a family of distinct entirely clock-derived divided signals, and said gating circuits comprise digital logic which selectively operates in response to the family of divided signals to clock derive each beginning and ending waveform transition of the derived generator signals in a precise predetermined time relation.

13. Apparatus for producing all necessary monochrome television-synchronizing signals with significantly improved time base stability and without requiring adjustment capability or delay circuitry comprising:
   a clock source of high-FREQUENCY clocking signal having a frequency magnitude several times greater than the highest frequency required to comprise any said television signal;
   a set of dividing counter circuits arranged in electrical communication whereby the first counter circuit receives and frequency divides the clock signal by a predetermined amount and each counter circuit thereafter receiving and further frequency dividing a divided output signal of a preceding counter circuit to thereby produce a plurality of outgoing entirely clock-derived pulse-trains,
   said counter circuits comprising flip-flop circuits the state of which is periodically shifted by changes in input and output potential induced by circuit input pulses imposed by feedback pulse-trains passed through feedback circuits spanning between selected flip-flop circuits to inhibit or accommodate passage of incoming pulses in a predetermined manner by presetting the flip-flop circuits to thereby control the count capacity at the rates desired;
   digital logic separately receiving the outgoing pulse-trains of the counter circuits and digitally translating the information of the mentioned pulse-trains into specific entirely clock-derived vertical drive, horizontal drive, composite sync. and mixed blanking waveforms.
   the digital logic comprising gate circuits the state of which is periodically shifted by input and output potential imposed on a given gate circuit through control functions upon command from the counter circuits to selectively pass pulses thereby creating through direct clock signal derivation in precise time relation each beginning and ending edge of the mentioned wave trains;
   output amplifiers receiving all output trains from the digital logic to provide suitable isolation, amplification and impedance matching of the mentioned trains for satisfactory distribution to external equipment.

14. Apparatus as defined in claim further comprising: a circuit for deriving a color subcarrier from the clock signal, the circuit serially comprising a frequency-dividing counter comprising circuits which reduce count capacity as mentioned in direct communication with the clock signal, a low-pass filter and an output amplifier.

15. In a television-synchronizing apparatus: means selectively issuing to external equipment at least an entirely clock-derived composite sync. output, a source of continuous clock pulses from which the beginning and ending transitions and the time duration between transitions of the composite sync. output are derived at predetermined times, a set of counters arranged in electrically connected relation receiving the clock pulses and formulating without time delay circuitry a plurality of pulse-trains directly based on clock pulses, logic circuitry to which said pulse-trains are communicated following frequency division and from which signals are sent to said selectively issuing means.

16. In an apparatus as defined in claim 15 wherein the logic circuitry comprises means receiving pulse-trains from the set of counters and means selectively issuing vertical and horizontal drive signals.

17. In a sync. generator for use in television origination and the like, a clock oscillator comprising means originating a comparatively high-FREQUENCY signal, counting logic circuitry comprising a plurality of multiple essentially "on" and "off" counters, means defining counter input and feedback terminals, and means by which input signals derived from the high frequency clock signal are electrically communicated to the counting logic circuitry, the counter logic circuitry also comprising counter feedback circuit means communicating signals from the counting logic circuitry to the feedback terminals which selectively electrically control counters to reverse state "on" and "off" output conditions by negative-going or positive-going transitions in counter incoming signals and counter feedback signals to reduce count capacity through elimination of undesired counting functions to thereby divide down the clock frequency, and circuitry producing no more than negligible time delay and including digital gating circuitry interposed in electrical communication between the counting logic circuitry and television reproduction equipment to receive counred-down pulse-trains from the counting logic circuitry and provide sync. generator output pulses.

18. In a method of providing improved time base stability in television synchronization: generating a continuous clock-originated signal; frequency dividing the clock-originated signal and deriving a family of distinct pulse-trains, transitions of which respectively correspond in time relation to a transition of the clock-originated signal; and gating distinct pulse-trains individually by digital logic without using intentional time delay phenomenon and thereby clock-deriving precisely at established times each leading and each trailing edge of pulses outgoing from the digital logic, and processing at least some of said outgoing pulses to external equipment for synchronization.

19. In a color television-synchronizing apparatus which issues to external equipment at least composite sync. and color subcarrier outputs: comprising a common clock source from which the composite sync. and color subcarrier signals are derived, the common source comprising means issuing a clock signal having a frequency which is an exact integer multiple of the frequency of the color subcarrier output; a first channel comprising dividing counter circuitry receiving clock signals, means processing signals outgoing from the counter circuitry and nondelay digital gating circuitry through which composite sync. signals obtained from the processed signals are gated; and a second channel comprising dividing counter circuitry directly receiving clock signals, means processing signals outgoing from the last-mentioned counter circuitry to derive the color subcarrier signal, and means from which the color subcarrier signal is output.

20. In a method of improved television synchronization: generating an oscillatory clock waveform, count selecting some but not all transition edges of the clock waveform and forming several pulse-trains therefrom, developing a plurality of synchronizing generator output signals by causing each trailing edge of pulses of the generator output signals to be based upon a respective selected transition edge of the clock signal and correlating precisely in time relation each trailing edge of pulses of the generator output signals with the respective transition edge of the clock signal upon which it is based.

21. In a method as defined in claim 20 wherein the synchronizing generator output signals comprise composite sync., horizontal drive and mixed blanking.

22. In a method of improved television synchronization: generating an oscillatory clock signal, count selecting certain clock signal transitions, processing the selected signal transitions and developing trailing edges comprising a repetitive pulse-train of at least one of composite sync., horizontal drive and mixed blanking synchronizing generator outputs by basing each said trailing edge of the pulse-train upon a different clock signal transition and by precisely time relating each said trailing edge of the pulse-train to the one pulse-train transition upon which it is based.

23. In a method of providing improved television-timing pulses: issuing a clock-derived waveform, identifying selected ones of time-spaced clock waveform transitions for use, using two identified ones of the selected time-spaced clock waveform transitions and the exact time relation between the two without delay processing to precisely establish an identical time duration between leading and trailing edges of each repetitive pulse of horizontal drive, vertical drive, composite sync. and mixed blanking output signals.

24. In a method of television synchronization: issuing a clock-derived waveform, count selecting certain ones of clock waveform transitions and directly deriving signals from the selected clock waveform transitions having respective signal transitions corresponding in time precisely to the selected clock waveform transitions, impressing the derived signals upon circuitry comprising gates, using at least some derived signal transitions to in exact predetermined time relation open and close said gates and passing at least some derived signal transitions through the gates when open, developing edges of pulses of a plurality of synchronizing generator output signals from the passed derived signal transitions each synchronizing generator output pulse being responsive to and precisely in time relation with a respective clock-derived waveform transition.

25. In a method of providing television synchronization: generating a clock waveform, selecting and processing predetermined ones of clock waveform transitions to obtain interim signals, edges of which are respectively time based upon separate clock waveform transitions, timing (a) the leading edge of each pulse of horizontal blanking and (b) the leading edge of each pulse of horizontal sync. for each horizontal interval of synchronizing generator signals respectively from separate interim signal edges each of which is derived from clock waveform transitions and used without intentional delay.

PO-1050
(5/69)

UNITED STATES PATENT OFFICE
CERTIFICATE OF CORRECTION

Patent No. __3,581,011__ Dated __May 25, 1971__

Inventor(s) __Ronald C. Ward et al__

It is certified that error appears in the above-identified patent and that said Letters Patent are hereby corrected as shown below:

Column 1, line 68, "SYNC. AS subcarrier" should read --sync. as well as a continuous 3.58 MHz subcarrier--.

Column 9, line 62, "ag 362" should read --at 372--.

Column 10, line 53, "298" should read --398--.

Column 11, line 35, "determined as (FIGS. also coincident" should read --determined as being also coincident--.

Column 12, line 61, "546" should read --564--.

Column 13, line 58, "of y low" should read --of low--.

Column 14, line 28, "this being" should read -- this time being --.

Column 14, line 73, "15.9µ" should read --15.9µ s--.

Column 15, line 3, "a y high" should read --a high--.

Column 17, line 46, "couting" should read --counting--.

Column 17, line 73 through Column 18, line 1, after "standards;" delete --additional clock-frequency dividing means continuously operative upon the clock signal to derive the color subcarrier frequency compatible with accepted television standards;--.

PO-1050
(5/69)

UNITED STATES PATENT OFFICE
CERTIFICATE OF CORRECTION

Patent No. 3,581,011      Dated May 25, 1971

Inventor(s) Ronald C. Ward et al     PAGE - 2

It is certified that error appears in the above-identified patent and that said Letters Patent are hereby corrected as shown below:

Column 18, line 58, after "claim" insert --13--.

Column 19, line 24, "counred" should read --counted--.

Signed and sealed this 19th day of October 1971.

(SEAL)
Attest:

EDWARD M. FLETCHER, JR.      ROBERT GOTTSCHALK
Attesting Officer      Acting Commissioner of Patents